C. VALA.
BUTT HOOK.
APPLICATION FILED OCT. 28, 1920.
1,388,494.
Patented Aug. 23, 1921.
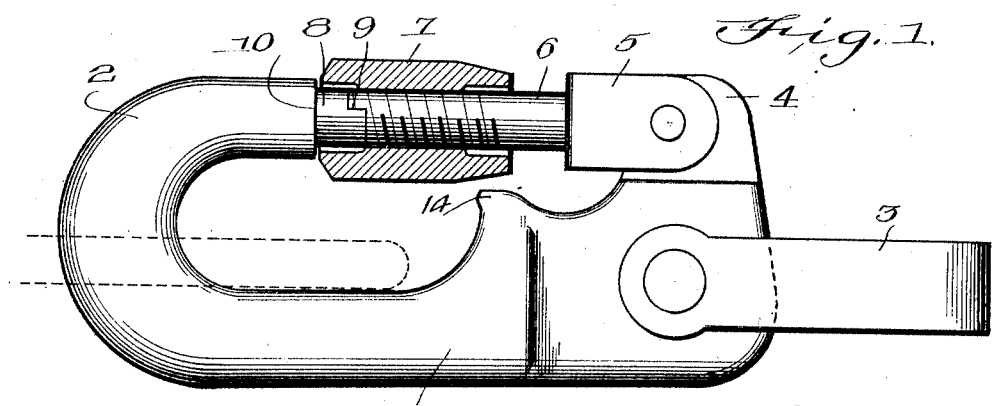
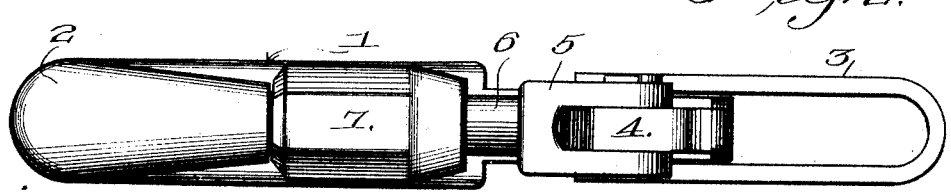
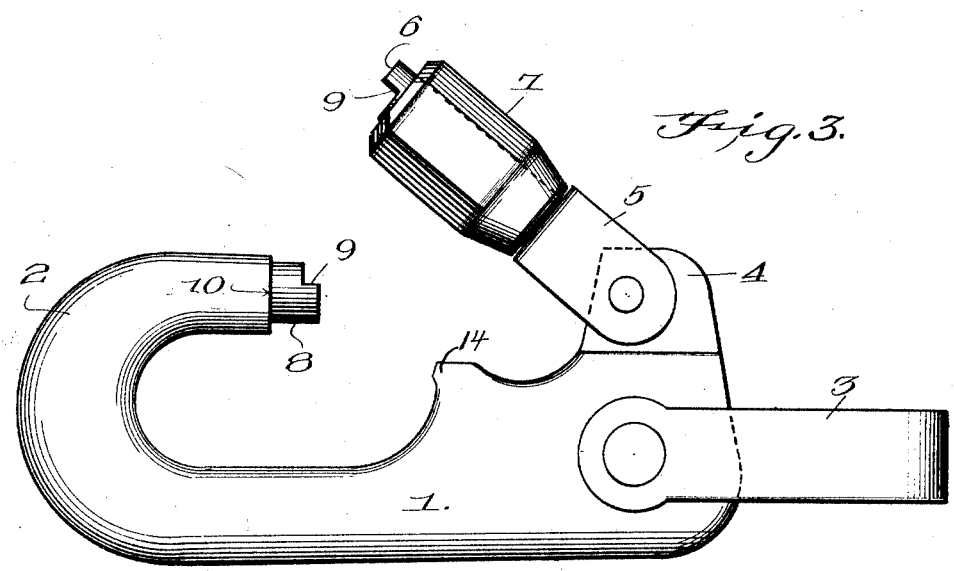
WITNESSES
INVENTOR
Charles Vala,
BY
ATTORNEYS

UNITED STATES PATENT OFFICE.

CHARLES VALA, OF MARSHFIELD, OREGON.

BUTT-HOOK.

1,388,494. Specification of Letters Patent. Patented Aug. 23, 1921.

Application filed October 28, 1920. Serial No. 420,284.

*To all whom it may concern:*

Be it known that I, CHARLES VALA, a citizen of the United States, and a resident of Marshfield, in the county of Coos and State of Oregon, have invented certain new and useful Improvements in Butt-Hooks, of which the following is a specification.

My invention is an improvement in butt hooks, and has for its object to provide a hook of the character specified, which cannot become unfastened accidentally, and which is not liable to become fouled with mud, brush and the like, and which may be readily attached and removed.

In the drawings:

Figure 1 is a side elevation of the hook with parts in section, and with the hook closed, Fig. 2 is an edge view, Fig. 3 is a side view with the hook open.

In the present embodiment of the invention, the improved hook consists of the usual body 1 having the bill 2, and having swiveled thereto at the end remote from the bill a clip 3, by means of which the hook may be attached to a logging chain. At the end adjacent to the clip 3, the body 1 has a lateral extension or ear 4 extending in the same direction as the bill from the body, and to this extension there is pivoted a substantially U-shaped member 5, the arms of the said member being pivoted on opposite sides of the extension or lug 4.

The body of this U-shaped member or yoke 5 has extending therefrom in the opposite direction to the arms a stem 6, and this stem is threaded as shown and is engaged by a sleeve 7 which is threaded onto the stem 6. A similar stem 8 extends from the bill toward the lug 4, and these stems are rabbeted as shown at 9, so that while they may move freely past each other in one direction, they cannot move beyond the position of alinement in the other.

The arrangement is such that the stem 6 may swing inward to a position where it is in alinement with the stem 8, but it cannot swing beyond such position. The sleeve 7 has both of the ends of its bore reamed or counter-bored as shown in Fig. 1, and the ends of the sleeve are adapted to abut the shoulder 10 formed between the stem 8 and the bill, or the body of the yoke 5, to limit the movement of the sleeve in opposite directions.

The improved hooks are used for hauling logs, and the log is engaged by a wire rope known as the choker. This choker has a loop at one end and a choker hook at the other. The loop is hooked on the butt hook, and the other end of the choker is passed around the log and the choker hook is hooked onto the body of the choker in such manner that it draws tight around the log.

After the log has been hauled in, the choker is carried back to the woods hanging on the butt hook, and with the ordinary hook the choker is liable to become lost and the hook to become fouled. With the improved lock, the choker cannot become accidentally dislodged nor can the bill become fouled. To attach the choker, the sleeve is turned back into the position of Fig. 1, and the lock is swung open. Now the loop of the choker may be engaged with the hook, and the log swung inward. The sleeve is now turned until the adjacent end thereof engages the shoulder 10, when the device is ready for operation.

As illustrated particularly in Figs. 1 and 3, the intermediate portion of the body 1 is provided with an upstanding integral shoulder which forms one end of the socket within which the choker hook is received. The upstanding shoulder which is designated by the numeral 14 also forms a restricted entrance opening to the socket in coöperation with the reduced stem 8. A particular advantage residing in the location of the upstanding shoulder 14 is the fact that it terminates adjacent the connecting sleeve 7 and serves to space the choker hook from the pivotal connection between the stem 6 and the body. Further the upstanding shoulder 14 protects the rear portion of the stem 6 or that portion of the stem which is not received within the connecting sleeve 7.

I claim:—

1. A logging hook comprising a body having a choker engaging bill terminating in a reduced stem forming an annular shoulder, a threaded locking stem having one end portion enlarged for forming a second shoulder and an attaching portion pivotally connected to said body, and a stem connecting sleeve of elongated formation threaded on said second named stem and confined between said shoulders, said elongated sleeve receiving the major portions of said stems for protecting the stems and reinforcing the connection between the same, said sleeve having its ends counter-bored for forming enlarged entrance openings for said stems, said sleeve being adapted to connect the stems for closing the hook.

2. A logging hook comprising a body having one end formed with a choker engaging bill defining a socket and terminating in a stem, a threaded locking stem pivoted to the other end of said body, and an elongated sleeve threaded on said locking stem and receiving the first named stem for closing said socket, the intermediate portion of said body being formed with an upstanding integral shoulder constituting one wall of said socket and coöperating with said first named stem in forming a restricted throat to said socket, said shoulder terminating adjacent the locking stem and at a point spaced from the pivot point of the same for protecting the pivot point from said choker and for protecting the exposed portion of said threaded locking stem.

3. A logging hook comprising a body having one end formed with a choker engaging bill defining a socket, a threaded locking stem pivoted to the other end of said body, and means detachably connecting said stem and said bill for closing said socket, the intermediate portion of said body being formed with an upstanding shoulder constituting one wall of said socket and coöperating with said first named stem in forming a restricted throat for said socket, said shoulder terminating close to said means and at a point spaced from the pivot element of said stem for protecting the pivotal connection between the stem and the body and for protecting the stem from the choker received within the socket.

CHARLES VALA.